Jan. 3, 1967 F. L. GEARY ETAL 3,295,764
VARIABLE AREA EXHAUST NOZZLE
Filed April 27, 1965 5 Sheets-Sheet 1
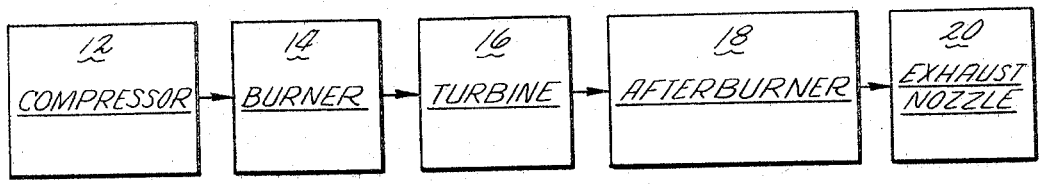
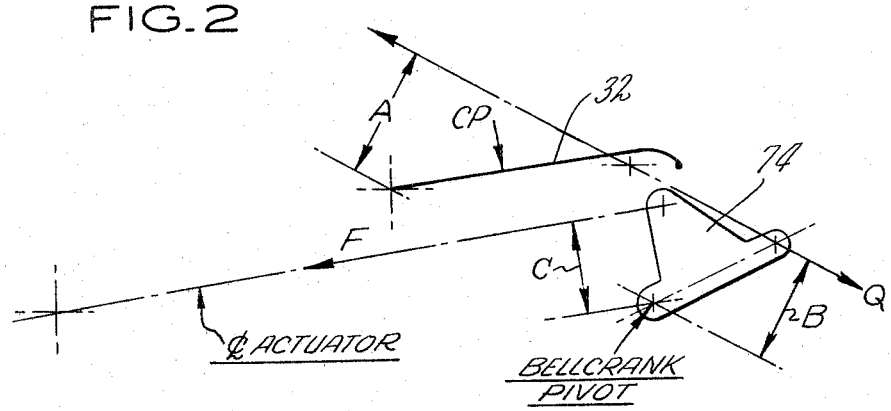
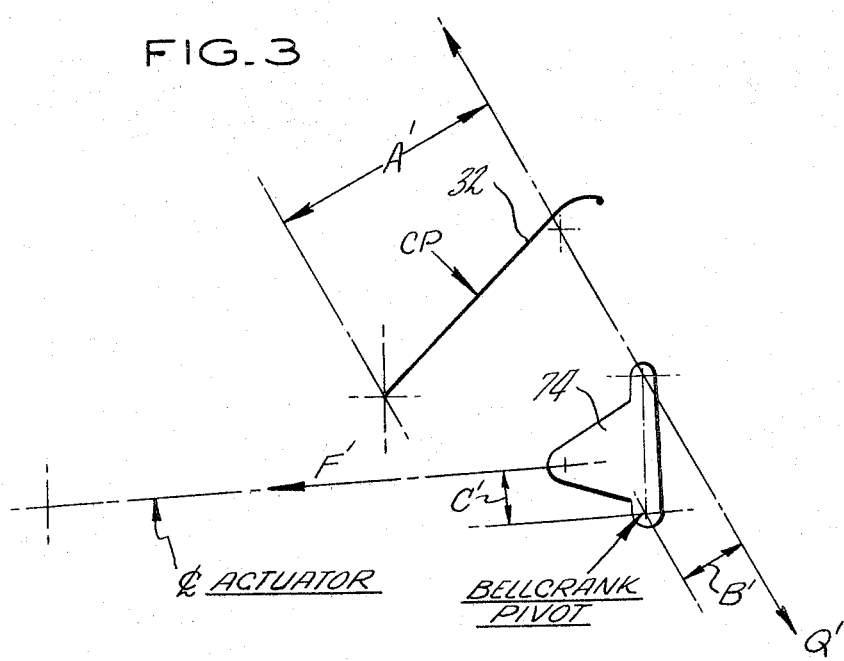
INVENTORS
FREDERICK L. GEARY
LAWRENCE J. LAUCK
EVERETT A. JOHNSTON
BY Vernon F. Hauschild
ATTORNEY

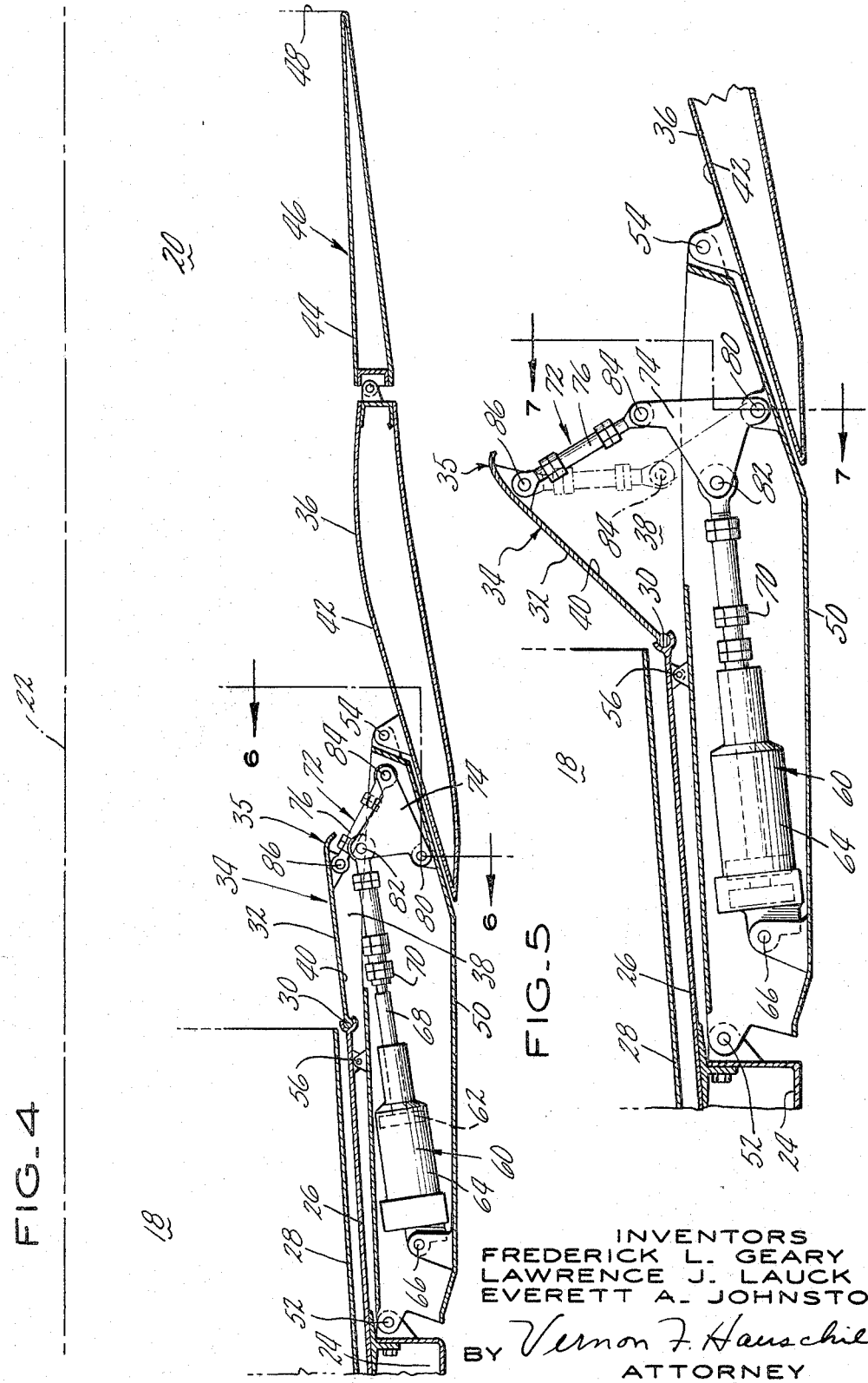

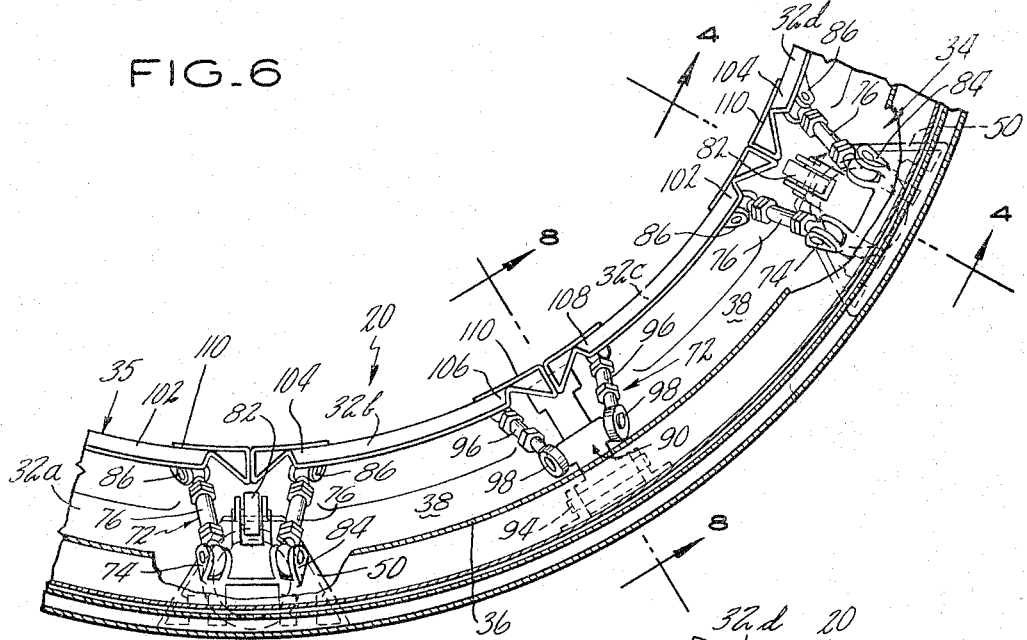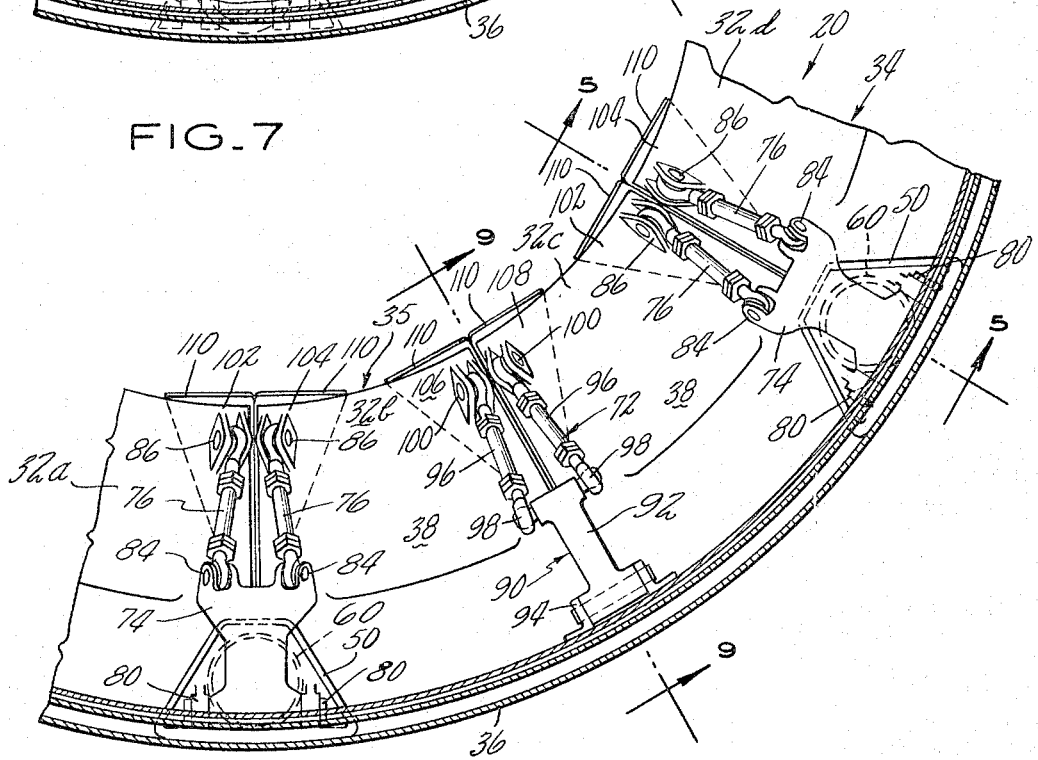

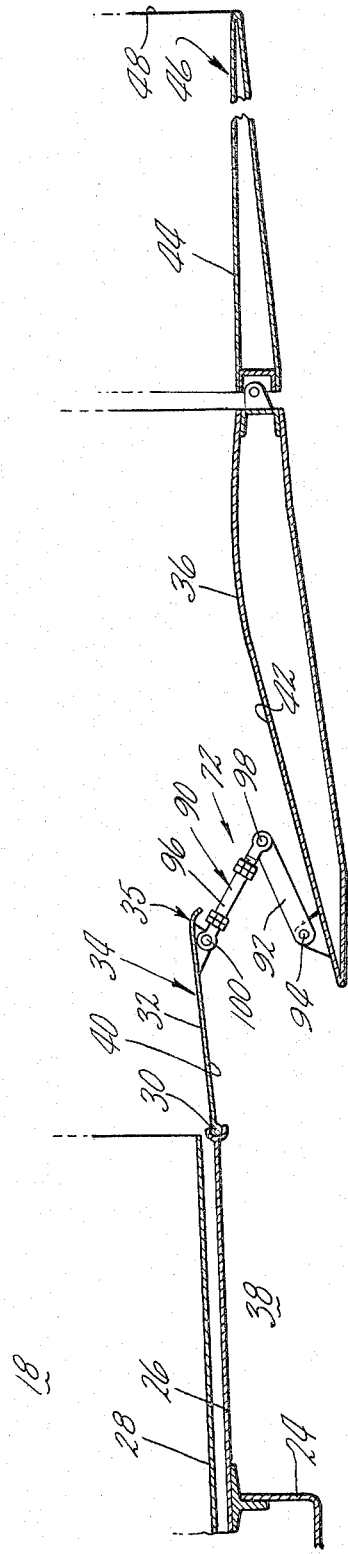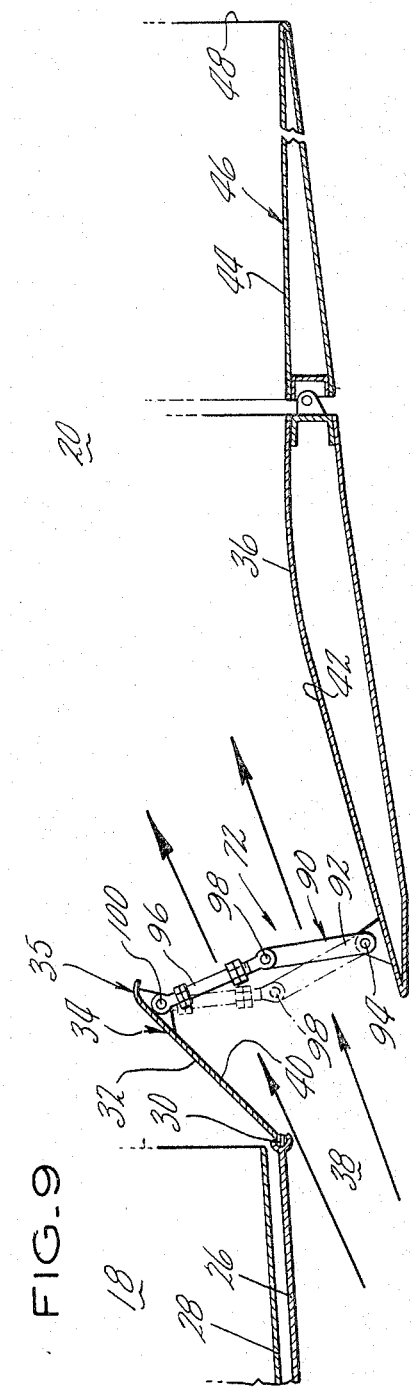
FIG. 8
FIG. 9

INVENTORS
FREDERICK L. GEARY
LAWRENCE J. LAUCK
EVERETT A. JOHNSTON

BY Vernon F. Hauschild
ATTORNEY

_United States Patent Office_

3,295,764
Patented Jan. 3, 1967

3,295,764
VARIABLE AREA EXHAUST NOZZLE
Frederick L. Geary, Springfield, Mass., Lawrence J. Lauck, Wapping, Conn., and Everett A. Johnston, Springfield, Mass., assignors to United Aircraft Corporation, East Hartford, Conn., a corporation of Delaware
Filed Apr. 27, 1965, Ser. No. 451,135
12 Claims. (Cl. 239—265.41)

This invention relates to exhaust nozzles and more particularly for exhaust nozzles used with powerplants which generate exhaust gases for discharge therethrough to atmosphere to perform a thrust generating function.

The exhaust nozzle taught herein is of the ejector type fully explained in U.S. Patent No. 3,062,002. In such an exhaust nozzle, atmospheric air flows into the exhaust nozzle and it is important not to block the flow of this atmospheric air. This requirement for minimal flow restriction presents a problem in the conventional exhaust nozzle flap actuation system wherein a unison ring is used to coordinate flap movement. These unison rings, shown in U.S. Patents Nos. 2,860,482 and 2,927,424, present flow blockage problems and are heavy.

It is an object of this invention to provide a jet exhaust nozzle, preferably of the ejector type, which presents minimum blockage to the ejector air flow over the flaps, is of minimum weight and which has an actuating mechanism which is of minimum size and complexity.

It is a further object of this invention to teach actuating mechanism for an exhaust nozzle, preferably of the ejector type, which eliminates the conventional unison ring and substitutes therefor actuating linkage attached to the adjacent edges of alternate flap pairs and which utilizes synchronizer linkage attached to the other adjacent flap edges.

It is still a further object of this invention to teach an exhaust nozzle actuating system wherein a substantially constant actuating force may be used at all times because the linkage mechanism involved in the actuator system provides a substantial mechanical advantage in the position of high flap loads as opposed to the position of low flap loads.

It is still a further object of this invention to teach an actuator system for an exhaust nozzle which utilizes no rubbing surfaces between parts but which utilizes links which are pivotally connected to one another throughout by ball-joints.

It is still a further object of this invention to teach an ejector type exhaust nozzle in which the fixed body of the exhaust nozzle is supported from the main powerplant by axially extending circumferentially positioned support struts which are hollow and which receive and carry the exhaust nozzle actuating mechanism therein.

Other objects and advantages will be apparent from the specification and claims and from the accompanying drawings which illustrate an embodiment of the invention.

FIG. 1 is a box-type representation of a conventional jet engine.

FIGS. 2 and 3 illustrate the forces and torques acting upon the flaps of the exhaust nozzle in the open or maximum area and the closed or minimum area positions, respectively, to illustrate the mechanical advantage available in this actuation system at the maximum flap load, closed, minimum area position of FIG. 3.

FIG. 4 is a cross-sectional showing of our exhaust nozzle taken through the actuators along line 4—4 of FIG. 6 to illustrate the exhaust nozzle and its actuating mechanism in the exhaust nozzle open position.

FIG. 5 corresponds to FIG. 4, but is slightly larger to bring out detail and shows the exhaust nozzle and its actuating mechanism in the exhaust nozzle closed position and is taken along line 5—5 of FIG. 7 and also shows alternate link and bell crank position.

FIG. 6 is a rear view of the primary portion of the exhaust nozzle and its actuating mechanism taken along line 6—6 of FIG. 4 showing the exhaust nozzle and the actuating mechanism in the exhaust nozzle open position.

FIG. 7 is a rear view of the primary portion of our exhaust nozzle and its actuating mechanism taken along line 7—7 of FIG. 5 to show the exhaust nozzle and its actuating mechanism in the exhaust nozzle closed position.

FIG. 8 is a sectional view taken along line 8—8 of FIG. 6 to illustrate the primary exhaust nozzle flaps and synchronizer links in the exhaust nozzle open position.

FIG. 9 is a cross-sectional view taken along line 9—9 of FIG. 7 to illustrate the primary exhaust nozzle flaps and synchronizer links in the exhaust nozzle closed position and also showing an alternate link position.

Figure 10:
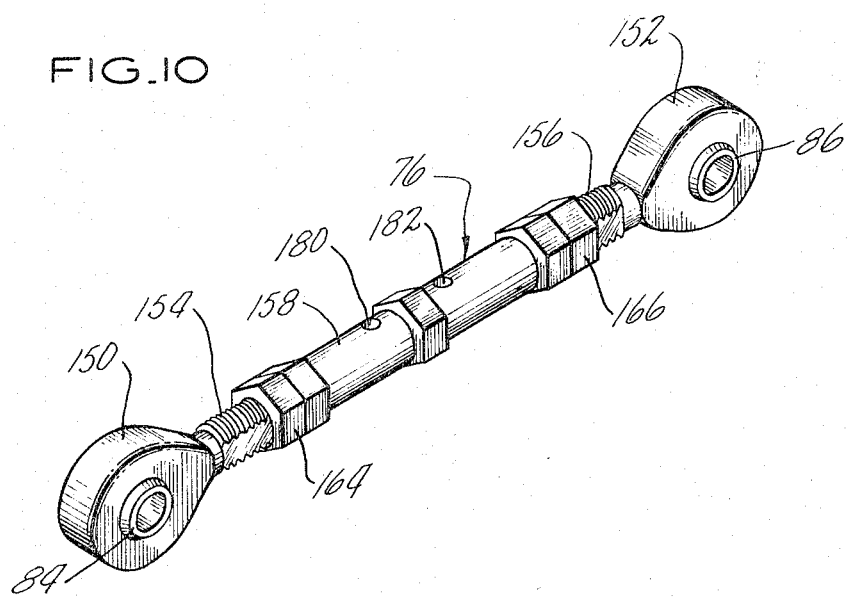

FIG. 10 is a perspective showing of the actuating link of our exhaust nozzle.

Figure 11:
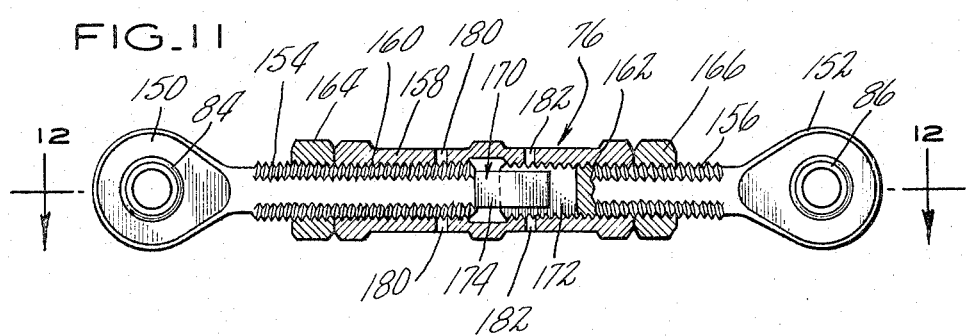

FIG. 11 is a showing, partly in cross-section, of the actuating link of our exhaust nozzle.

Figure 12:
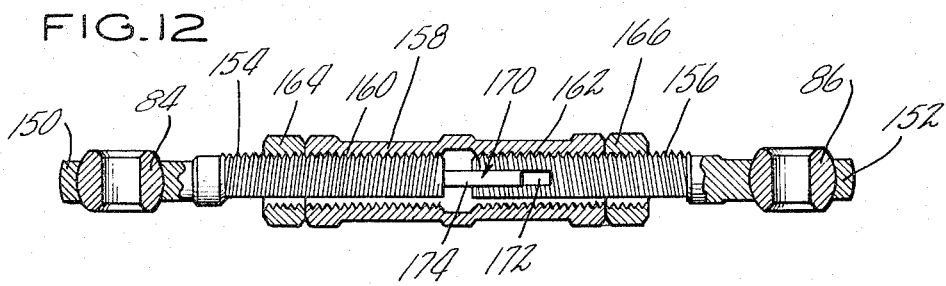

FIG. 12 is a sectional view taken along line 12—12 of FIG. 11.

Since our exhaust nozzle may be used with any conventional jet engine, but is particularly adapted for use as an ejector type exhaust nozzle, FIG. 1 illustrates a conventional jet engine 10 which comprises compressor section 12, burner section 14, turbine section 16, afterburner 18 and exhaust nozzle 20. In conventional jet engine design, air enters compressor section 12 and is compressed therein and is passed therefrom for heating in burner section 14. The heated air from burner section 14 then passes into turbine section 16 where energy is extracted therefrom to drive compressor 12 and from which the turbine exhaust gases are discharged to afterburner 18 for reheating and then to atmosphere through exhaust nozzle 20 to perform a thrust generating function. Engine 10 is of conventional design and forms no part of this invention. Engine 10 may be of the type more specifically illustrated in U.S. Patents Nos. 2,711,631, 2,747,367 or 3,095,166. Afterburner 18 may be of the type more particularly described in U.S. Patents Nos. 2,846,841 and 2,846,842. Exhaust nozzle 20 is preferably of the ejector type described in greater particularity in U.S. Patents Nos. 3,062,003 and 3,057,150. All of these patents are hereby incorporated by reference.

Our exhaust nozzle 20 and its actuating mechanism is shown in greater particularity in FIGS. 4–9.

Exhaust nozzle 20 is preferably of circular cross section and concentric about axis 22 and is positioned downstream of afterburner 18 and is supported by support ring 24, which may be attached to the engine nacelle or any convenient load carrying structure. Support ring 24 projects radially outwardly from afterburner case 26, which envelops afterburner liner 28. The after end of afterburner duct 26 has a ball and socket hinge 30 attached thereto to pivotally receive and anchor the leading edge of primary flaps 32. Flaps 32 are circumferentially positioned about axis 22 so as to form primary exhaust nozzle 34 which is variable area as flaps 32 pivot between their maximum throat area open position shown in FIGS. 4, 6 and 8 and their minimum throat area closed positions shown in FIGS. 5, 7 and 9. Primary exhaust nozzle 34 defines primary exhaust nozzle outlet 35.

Our exhaust nozzle 20 also includes fixed annular member 36 positioned outwardly of flaps 32 and spaced downstream of exhaust nozzle support ring 24 so as to form ejector air inlet passage 38 therebetween. Atmospheric air passes through ejector passage 38 across the outer surface 40 of flaps 32 and the inner surface 42 of fixed member or afterbody 36 and it is essential that minimum blockage of the ejector air flow be created by the flap actuating mechanism.

A plurality of circumferentially positioned boat-tail flaps 44 are pivotally attached to fixed afterbody 36 to form variable area secondary exhaust nozzle 46 and outlet 48 thereof.

Annular fixed afterbody 36 and boat-tail flaps 44 are supported by support ring 24 and afterburner duct 26 through a plurality of axially extending, circumferentially positioned and equally spaced hollow struts 50, shown in FIGS. 4 and 5, which are pivotally attached to support ring 24 at quick attach-detach joint 52, and to afterburner duct 26 by quick attach-detach joint 56 and then the fixed annular member or afterbody 36 is pivotally attached to the aft end of struts 50 at quick attach-detach joint 54. Quick attach-detach joints 52, 54 and 56 are preferably spaced lugs having aligned holes with bolts passing therethrough. The purpose of quick attach-detach joints 52, 54 and 56 is to permit the rapid removal or installation of exhaust nozzle 20 from or onto engine 10. Support struts 50 are preferably substantially frusto-conical in cross section as best shown in FIGS. 6–7 and pass through ejector air passage 38. Since support struts 50 are hollow, they perform the important function of housing the flap actuating piston-cylinder arrangement 60, which comprises piston 62 housed within cylinder 64. Piston-cylinder actuating mechanism 60 is pivotally attached to support strut 50 at pivot point 66 and includes actuating rod 68 extending from piston 62 for reciprocation therewith. Due to the inclusion of the turnbuckle type expansion joint 70, actuating rod 68 is of variable length.

The remainder of the primary flap actuation system 72 consists of bell crank 74 and actuating links 76. Bell crank 74 is attached to support strut 50 at pivot joint 80 and is pivotally attached to actuating piston cylinder arrangement 60 at ball joint 82 and is attached to actuating links 76 at ball joints 84. The other ends of actuating links 76 are connected to flaps 32 by ball joints 86.

In view of the connections just described, it will be seen that as actuating cylinder-piston unit 60 is caused to actuate by any convenient pressure source such as air from compressor 12, or fluid from an engine accessory gearbox driven fluid power pump, actuator 60, bell crank 74, actuating links 76 and primary flaps 32 are caused to move between their FIG. 4 open position and their FIG. 5 closed position. The remainder of flap actuating mechanism 72 includes synchronizer linkage mechanism 90 shown in FIGS. 6 through 9, which comprises a first link 92 pivotally attached to fixed member 36 at pivot joint 94. The other end of link 92 is pivotally connected to synchronizer links 96 through ball joints 98. The other end of synchronizer links 96 are attached to flaps 32 by ball joints 100.

By viewing FIGS. 6 and 7, it will be noted that bell crank 74 and actuating links 76 are attached to the adjacent edges 102 and 104 of alternate flap pairs (32a–32b, 32c–32d) while synchronizer links 90 and 96 are attached to the adjacent edges 106 and 108 of the remaining flap pairs (32b–32c). Conventional flap seals 110 extend between adjacent flaps.

Accordingly in my flap actuating mechanism 72, bell crank 74 and actuating links 76, serves to actuate one edge of each flap 32 while synchronizer links 90 and 96 serve to synchronize the motion of the other edge of each flap 32 so that all flaps move synchronously between their minimum area FIG. 5 position and their maximum area FIG. 4 position.

If the bell crank 74 and links 76 travel beyond top center as shown in phantom in FIG. 5 by increasing the actuator 60 stroke at one end of its travel it is possible to lock the system in the nozzle closed, normal operating position. The actuating fluid pressure inside the cylinder actuator 60 can be lost and the nozzle would still remain closed. This would permit the engine to keep operating at the non-afterburning condition. FIG. 9 shows in phantom the corresponding position of the synchronizer links 90 and 96.

In the past, unison rings of the type shown in U.S. Patents Nos. 2,860,482 and 2,927,424 enveloped all flaps and was translated axially to cause all flaps to move in unison. The unison ring form of flap actuation is particularly unattractive in an ejector type exhaust nozzle not only because it is heavy but because it would be positioned in ejector passage 38 and thereby block ejector air flow. It will be noted with our construction, as best shown in FIGS. 6 and 7, that with actuating mechanism 72 positioned at the flap edges only, the remaining portion of ejector passage 38 is free of flow obstruction and that the placing of actuating cylinders 60 in support struts 50 serves to minimize blockage of ejector passage 38.

As previously explained, it is an important teaching of our invention that the force required to be exerted by actuating cylinder-piston arrangement 60 be substantially constant throughout the range of flaps 32 travel. This is difficult to accomplish because when flaps 32 are in their inner, minimum area, FIG. 5 position, they can be subjected to substantially higher gas loads than when in their maximum area, open, FIG. 4 position. Our linkage accomplishes this uniform force advantage by providing a mechanism which offers substantial mechanical advantage in the heavy flap load FIG. 5 position over the light flap load FIG. 4 position. This mechanical advantage can best be illustrated by viewing FIGS. 2 and 3. By viewing FIG. 2 we see flap 32 in its open FIG. 4 position. From FIG. 2 we see that the torques acting on bell crank 74 are the actuating cylinder force F times its moment arm C and the flap or link force Q times its moment arm B. Equating these moments we arrive at the formula:

$$F \times C = Q \times B$$

Solving for the flap or actuating link force Q we arrive at the equation:

$$Q = F \times C / B$$

Representing this force as a moment on flap 32 or link 76 we can rewrite this equation as:

$$\text{moment on flap or links} = \frac{F \times C}{B} \times A$$

If we set up the same equation when flap 32 is in its closed-high load, FIG. 3 position, we note that the size of moment arms C and B are reduced while the size of moment arm A is increased and are represented in FIG. 3 as moment arms A', B' and C' while the forces are represented as F' and Q'. We may establish the following formula to represent the moment acting on flaps 32 or their linkage in the closed FIG. 3 position:

$$\text{moment on flap or line} = \frac{F' \times C'}{B'} \times A'$$

by measurement we can substitute for the above formula:

$$\text{moment on flap or link} = \frac{F.59C}{.625B} \times 1.75A$$

solving this equation we determine that the mechanical advantage on the flap actuating system in its FIG. 3 position is 1.65 times the FIG. 2 position.

Referring to FIGS. 10, 11, and 12, we see expandable ball jointed actuating link 76 in greater particularity. It is important that this expandable actuating link have ball joints 84 and 86 at its opposite ends so that it may pivotally attach to the attachment mechanism and it is also important that the link ends 150 and 152, which receive ball joints 84 and 86, be capable of being maintained in angular alignment or in a selected degree of angular misalignment during all phases of operation and length adjustments of actuating rod 76 at installation.

Actuating link 76 comprises rod ends 150 and 152 which have threaded shank sections 154 and 156, respectively. The thread of shank section 154 of rod end 150 may be either left-hand or right-hand and the thread of shank section 156 of rod end 152 must be of opposite hand to that of shank section 154. Turnbuckle nut 158 has opposite hand threading on the inner diameter at its opposite ends 160 and 162 to cooperatively engage the threads of shank sections 154 and 156 so that, as turnbuckle nut 158 is rotating, the coaction of mating threads 154–160 and 156–162 cause actuating link 76 to either increase or decrease in length depending upon the direction in which turnbuckle nut 158 is being rotated. When link 76 is of desired length, lock nuts 164 and 166, which have inner diameter threads which cooperate with the threads of shank sections 154 and 156, respectively, are set against turnbuckle nut 158 to prevent further rotation thereof, whereby locking turnbuckle nut 158 with respect to rod ends 150 and 152 so as to maintain actuating link 76 at a preselected length.

It is important during the lengthening or shortening operation of actuating link 76 that the rod ends 150 and 152 be maintained in preselected relative angular position and this is accomplished by the use of locking means 170. Locking means 170 consists of axially extending groove 172 in shank 156 of rod end 152 and axially extending tongue 174 projecting from shank 154 of rod end 150 and being received in groove 172 to prevent relative rotation between rod ends 150 and 152. It will be noted by those skilled in the art that after lock nuts 164 and 166 are loosened to permit the rotation of turnbuckle nut 158, the cooperation of thread elements 154–160 and 156–162 will cause actuating link 76 to increase or decrease in length while maintaining rod ends 150 and 152 in the desired angular relation relative to one another by preventing relative rotation therebetween.

Sight holes 180 and 182 in turnbuckle nut 158 permit viewing of the connection between tongue 174 and groove 172.

It is to be understood that this invention is not limited to the specific embodiment herein illustrated and described but may be used in other ways without departure from its spirit as defined by the following claims.

We claim:

1. A jet exhaust nozzle having an axis, a plurality of movable circumferentially positioned exhaust nozzle flaps mounted to form an exhaust outlet, means to actuate said flaps to vary the area of said outlet, said actuating means being attached to adjacent edges of alternate flap pairs, and synchronizer means attached to adjacent edges of the remaining flap pairs.

2. In an ejector exhaust nozzle having an axis, an annular support member, a fixed afterbody positioned axially rearward of said support member to form an ejector inlet therebetween, hollow support struts extending between said support member and said afterbody to support said afterbody from said support member, a plurality of circumferentially positioned movable flaps positioned adjacent said inlet and cooperating to form a variable area exhaust outlet, link means connected to move said flaps, and actuating mechanism located in said hollow struts and connected to actuate said link means.

3. In a variable area exhaust nozzle, a plurality of movable flaps, means to support the exhaust nozzle, means to support the flap plurality, a plurality of hollow struts extending between said nozzle support means and said flap support means to support said flap support means from said nozzle support means, and flap actuating mechanism located within said hollow struts.

4. In an exhaust nozzle, a plurality of circumferentially positioned flaps movable to define a variable area exhaust outlet, first linkage means attached to alternate adjacent edges of said flaps, means to actuate said first linkage means so as to move said flaps and vary the area of said exhaust outlet, second linkage means attached to the remaining adjacent edges of said flaps to synchronize all flap motion.

5. In a variable area exhaust nozzle of the ejector type which is concentric about an axis, exhaust nozzle support means, a fixed annular member positioned downstream of said nozzle support means to define an ejector air passage therebetween, a plurality of axially extending circumferentially positioned and spaced struts extending between said nozzle support means and said fixed annular member to support said fixed annular member from said nozzle support means, a plurality of circumferentially positioned flaps positioned inwardly of said fixed annular member and mounted to be movable so as to form a variable area primary exhaust nozzle, flap actuating means including first link mechanism attached to adjacent edges of alternate adjacent flaps to actuate said flaps, and second linkage mechanism attached to the remaining adjacent edges of the flaps to synchronize the movement of said flaps.

6. In a variable area exhaust nozzle of the ejector type which is concentric about an axis, exhaust nozzle support means, a fixed annular member having an upstream end and a downstream end and being positioned downstream of said nozzle support means to define an ejector air passage therebetween, a plurality of axially extending circumferentially positioned and spaced hollow struts extending between said nozzle support means and said fixed annular member to support said fixed annular member from said nozzle support means, a first plurality of circumferentially positioned flaps positioned inwardly of said fixed annular member and mounted to be pivotable so as to form a variable area primary exhaust nozzle, first flap actuating means including first link mechanism attached to adjacent edges of alternate adjacent first flaps to actuate said first flaps and also including actuating cylinder mechanism positioned in said hollow struts and attached to actuate said first link mechanism, second link mechanism attached to the remaining adjacent edges of said first flaps to synchronize the movement of said first flaps, and a second plurality of circumferentially positioned flaps pivotally attached to the downstream end of said annular member to be movable so as to form a variable area secondary exhaust nozzle.

7. In a variable area exhaust nozzle of the ejector type which is concentric about an axis, exhaust nozzle support means, a fixed annular member having an upstream end and a downstream end and being positioned downstream of said nozzle support means to define an ejector air passage therebetween, a plurality of axially extending circumferentially positioned and spaced hollow struts extending between said nozzle support means and said fixed annular member to support said fixed annular member from said nozzle support means, a first plurality of circumferentially positioned flaps positioned inwardly of said fixed annular member and mounted to be pivotable so as to form a variable area primary exhaust nozzle, first flap actuating means including first link mechanism attached to adjacent edges of alternate adjacent first flaps to actuate said first flaps and also including actuating cylinder mechanism positioned in said hollow struts and attached to actuate said first link mechanism, second link mechanism attached to the remaining adjacent edges of said first flaps to synchronize the movement of said first flaps, and a second plurality of circumferentially positioned flaps pivotally attached to the downstream end of said annular member to be movable so as to form a variable area secondary exhaust nozzle, said first flap actuating mechanism including two links pivotally attached to adjacent edges of alternate adjacent first flaps, and a bell crank pivotally attached to said strut, said actuating cylinder mechanism and said two links to actuate said first flaps.

8. Apparatus according to claim 7 including balljoint means to pivotally connect said bellcrank, said actuating cylinder mechanism and said two links and to connect said two links to said adjacent edges of said alternate adjacent first flaps.

9. Apparatus according to claim 8 and including quick attach-detach means connecting said struts to said exhaust nozzle support means, said fixed annular member and said bellcrank to said strut.

10. Apparatus according to claim 7 including actuating force producing means to actuate said actuating cylinder mechanism thereby causing said bellcrank to pivot to actuate said two links and thereby pivot said first flaps between a first end position wherein said primary exhaust nozzle is in its minimum area position and a second end position wherein said primary exhaust nozzle is in its maximum area position, said bellcrank being so shaped that the mechanical advantage acting on said primary flaps is maximum when said primary exhaust nozzle is in said minimum area position and minimum when said primary exhaust nozzle is in said maximum area position so that the actuating force producing means may produce a substantially constant actuating force for all first flap positions.

11. In a jet exhaust nozzle having an axis, a plurality of circumferentially positioned flaps movable to define a variable area exhaust outlet, and means to synchronously actuate said flaps including first linkage means attached to alternate adjacent edges of said flaps and synchronizer linkage attached to the remaining adjacent edges of said flaps.

12. In a variable area exhaust nozzle concentric about an axis, a plurality of circumferentially positioned flaps, means to pivotally support said flaps, a flap actuating bellcrank, means to pivotally support said bellcrank, linkage means pivotally connecting said flap to said bellcrank, reciprocating actuating means pivotally connected to said bellcrank and actuatable to cause said bellcrank and said flaps to pivot between an exhaust nozzle maximum area position and an exhaust nozzle minimum area position and to thereby establish a first force moment between said bellcrank pivot and said actuator, and to further establish a second force moment between said bellcrank pivot and said link, and to still further establish a third force moment between said flap pivot and said link, said bellcrank being shaped so that said first and second force moments are maximum and said third force moment is minimum in said exhaust nozzle maximum area position and so that said first and second force moments are minimum and said third force moment is maximum in said minimum area position.

References Cited by the Examiner

UNITED STATES PATENTS

| | | | |
|---|---|---|---|
| 2,846,841 | 8/1958 | Jordan | 239—265.41 |
| 2,846,842 | 8/1958 | Brown | 239—265.41 |
| 2,860,482 | 11/1958 | Gardiner et al. | 239—265.41 |
| 2,927,424 | 3/1960 | Hyde | 239—265.41 |
| 2,932,163 | 4/1960 | Hyde | 239—265.41 |
| 3,057,150 | 10/1962 | Horgan | 239—265.41 |

EVERETT W. KIRBY, *Primary Examiner.*